Oct. 23, 1962

C. A. LORD 3,059,886

APPARATUS FOR PREVENTING SHIFTING OF CONTAINERS FOR
FREIGHT CARGOES DURING TRANSPORTATION

Filed July 13, 1960

INVENTOR.
Charles A. Lord
BY
ATTORNEYS

Oct. 23, 1962    C. A. LORD    3,059,886
APPARATUS FOR PREVENTING SHIFTING OF CONTAINERS FOR
FREIGHT CARGOES DURING TRANSPORTATION
Filed July 13, 1960    3 Sheets-Sheet 2
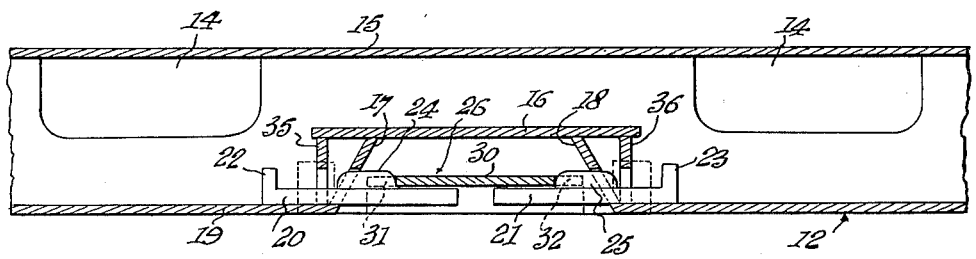
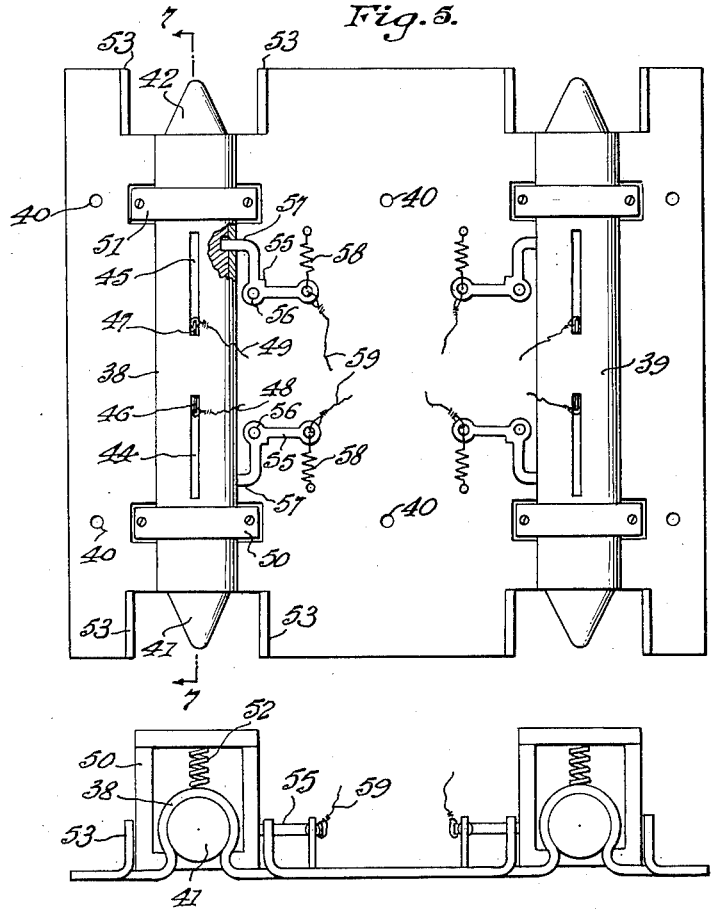
INVENTOR.
Charles A. Lord
BY
ATTORNEYS Oct. 23, 1962

C. A. LORD 3,059,886

APPARATUS FOR PREVENTING SHIFTING OF CONTAINERS FOR
FREIGHT CARGOES DURING TRANSPORTATION

Filed July 13, 1960

INVENTOR.
Charles A. Lord
BY
ATTORNEYS the United States Patent Office 3,059,886
Patented Oct. 23, 1962

3,059,886
APPARATUS FOR PREVENTING SHIFTING OF CONTAINERS FOR FREIGHT CARGOES DURING TRANSPORTATION
Charles A. Lord, Verona, N.J., assignor to the United States of America as represented by the Secretary of the Army
Filed July 13, 1960, Ser. No. 42,730
3 Claims. (Cl. 248—119)
(Granted under Title 35, U.S. Code (1952), sec. 266)

The invention described herein may be manufactured and used by or for the Government for governmental purposes without the payment of any royalty thereon.

The present invention relates to improved means for holding standard cargo containers against displacement when being carried on transportation vehicles, such as a flat deck of a railway flat car or a flat platform or deck of other types of transportation vehicles on which the container may be loaded for transport to any destination. More particularly, the invention provides improved structural features of a latching device for the containers, which latching or hold-down devices, are provided for latching the containers in place, and which are purposefully readily releasable for enabling any given container to be removed when desired at a given destination. Unless some kind of latching or hold-down means be employed, positional displacements of such cargo containers with respect to a flat surface of a conveyance on which such containers are being transported becomes a definite likelihood with concomitant likelihood of a wide variety of damaging or deleterious effects, such cargo shifting resulting from motional vibrations or irregularities occurring during transit of the cargo.

From the foregoing, it will be noted that one of the objects of the instant invention is to provide an improved construction of a latching or hold-down means for securing in their proper place on transporting vehicles, such as a railroad flat car or a truck, or other transportation vehicles, rectangular or cubical cargo containers, the construction of which latching means includes a portion firmly but detachably connected to the deck or surface of the transporting vehicle, and a cooperating portion carried by, or constituting a part of, the container which releasably latches the container to the vehicle, comprising means for guiding the container into latching position as the container is lowered onto the vehicle, and which may include manually operated or automatic latching means adapted to hold the container firmly in place on the vehicle against such forces as the "humping" of freight cars, or other shocks, jars, and vibrational disturbances during travel, and any other action which might tend to displace the container from its designated position on the vehicle.

A further object of the invention is to provide an improved latching construction of the above-indicated character which is reusable without requirement of reconditioning, and which can be transferred from one transporting vehicle to another.

Further objects and advantages of the present construction will become apparent as the description proceeds, and the features of novelty will be pointed out in particularity in the appended claims.

The structural features and details of the present invention will be understood more readily by references to the accompanying drawings, in which:

FIG. 4 is a fragmentary cross-sectional view substantially on a plane indicated on the line 4—4 of FIG. 2, looking in the direction of the arrows, the view showing a set of latching bolts and a latching plate in operative association;

FIG. 5 is a top plan view of a modified form of latch assembly for securing a cargo container in place on a transportation vehicle;

FIG. 6 is an end elevation of the structure shown in FIG. 5;

Figure 1:
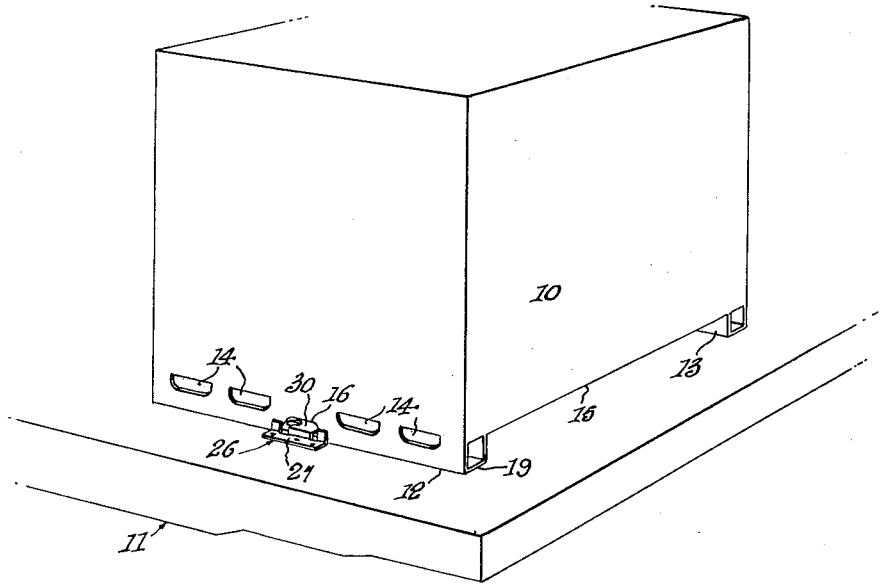
FIG. 1 is a perspective view of a cargo container which is being held in position on a transportation vehicle, such as a railroad flat car, by latching mechanism including structural features in line with the present invention, the vehicle being shown fragmentarily.
Figure 3:
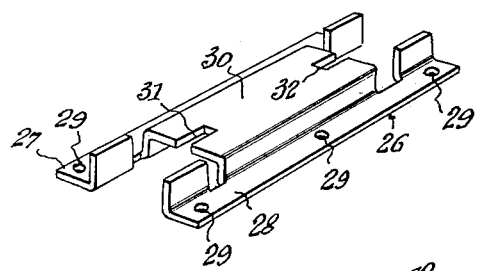
FIG. 3 is a perspective view of a latching plate constructed in accordance with the present invention, the plate being adapted to be secured on the deck of a transportation vehicle for receiving latching bolts shown in FIG. 2.

Referring more particularly to the drawings and especially to FIGS. 1 through 4 inclusive, the reference numeral 10 indicates generally a cargo container for transporting various types of material in unitized containers of standard size, shape, and construction, the cargo container 10 being, by way of illustrative example, a "Conex" container as developed by the United States Armed Forces, for transporting materials in standardized containers, although it will be understood that the invention is not restricted in its application to such type of containers. Such "Conex" containers have a maximum optimum load capacity of approximately 9,000 lbs. and are so dimensioned that one or two rows of them can be arranged along the flat deck of a railway flat car, or a railway gondola car. These containers fully protect the cargo disposed therein, and are self-supporting, but it is necessary to secure them firmly in place on the transporting vehicle, such as a railway flat car generally indicated at 11, so that they will not move or shift during the transporting operation.

Each of the containers 10 is provided with two supporting skids, indicated at 12 and 13, there being one at each of the two opposite sides of the container and in parallel relationship to each other. In practice, they have a length substantially equal to the corresponding dimension of the container, and a height of approximately six inches, so that they support the container a sufficient distance above a floor or deck to permit the forks of a fork-lift vehicle to be inserted under the container to lift the container. For providing for a four-way approach for the lifting vehicle to the container, the skids are provided with a series of aligned openings 14, through which the forks of a fork-lift vehicle may be inserted if the vehicle approaches the container from the side rather than from one end.

Figure 2:
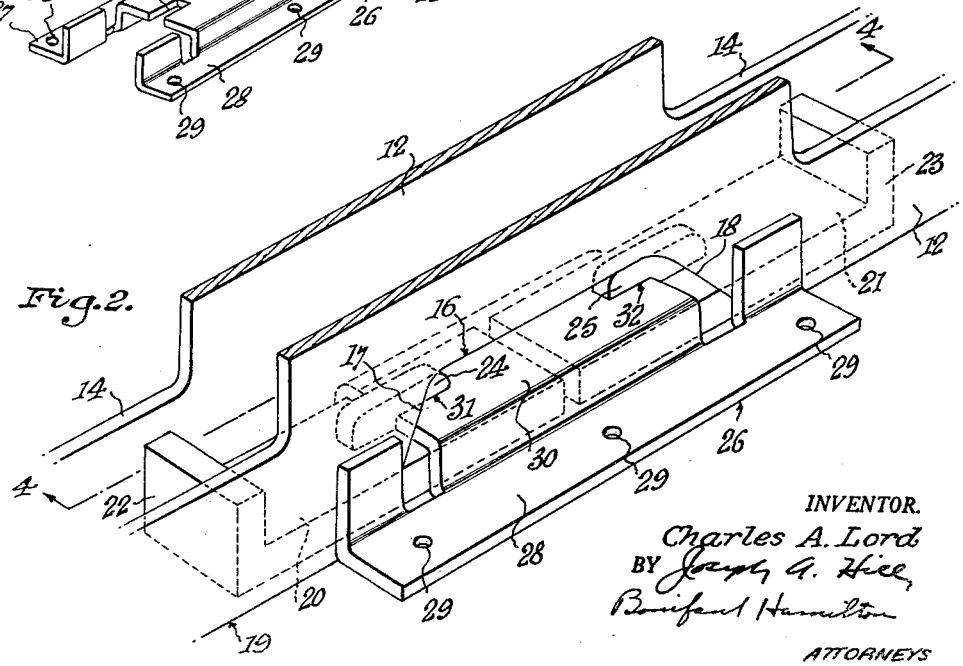
FIG. 2 is a fragmentary perspective view of a cargo container skid equipped with latching bolts for securing the container in place on a transportation vehicle.

Containers of the type specifically noted above are constructed of suitable sheet steel or of steel plates, and the skids 12 and 13, likewise are formed of steel members of suitable thickness. As is shown in FIGS. 2 and 4, each skid is of U cross-sectional shape, having its open side facing upwardly, and the floor plate 15 of the container 10 is welded to the top of the skid at locations between the openings 14 so that the container 10 with its two supporting skids constitutes a unitary construction. At its mid-length location, each of the skids is provided with a transverse central opening 16 which extends across the bottom web of the skid and upwardly in opposite side walls of the skid from the plane of the bottom web of the skid to approximately one-half the height of the skid. This opening has a length materially greater than the width or thickness of the skid, and has downwardly and outwardly flaring end walls, as are indicated at 17 and 18. The skid with the mid-length opening therein, as has been described above, is a standard construction which is utilized in the hold-down arrangement of the present invention.

As is shown in FIG. 4, the end walls 17 and 18 at the opposite ends of the mid-length opening 16 in the skid are each provided with a rectangular opening extending transversely of the skid just above the inner or upper surface of the bottom wall 19 of the skid. A locking bolt 20 extends slidably through the rectangular opening in the end wall 17, and a similar locking bolt 21 extends slidably through the rectangular opening in the end wall 18. Each locking bolt is of rectangular cross-sectional shape and each bolt has on the end thereof remote from the opening 16, an upwardly extending tongue or abutment flange, as indicated at 22, for the bolt 20, and at 23 for the bolt 21. Each locking bolt also carries an upwardly extending vertical rib or fin, as indicated at 24 and 25 for the bolts 20 and 21, respectively, these ribs extending vertically from the top surfaces of the portions of the bolts disposed within the mid-length opening 16 of the skid, the construction being such that the bolts may be inserted into the interior of the skid through the openings 14 at the opposite sides of the mid-length opening 16, and then moved through the openings in the end walls 17 and 18 of the center opening of the skid.

Hold-down or latch-down plates, as are indicated at 26, are secured to the deck of the transporting vehicle at a location such that a plate will be centered under each skid mid-length opening 16 when the container 10 is positioned properly on the vehicle. These plates 26 are rectangular and H-shaped and each plate comprises flanges, as indicated at 27 and 28, extending one along each side of the plate in spaced apart and parallel relationship to each other. Each flange is provided with a plurality of spaced-apart bolt-or-screw-holes 29, through which suitable fasteners, such as lag screws, can be inserted and threaded into the material of the deck of the transporting vehicle to secure, firmly but detachably, the hold-down plates in place on the deck or floor of the vehicle. Each hold-down plate 26 has a raised sleeve portion 30 extending between the inner edges of its two flanges 27 and 28 and symmetrically spaced from the opposite ends of these flanges. This sleeve portion 30 is arched upwardly between the flanges so that the two bolts 20 and 21 can pass beneath the sleeve portion of the plate, which forms sleeve means for the bolts. The sleeve means of the plate also preferably may be provided in its opposite ends with transversely centralized notches 31 and 32, which receive the ribs 24 and 25 on the corresponding latching bolts 20 and 21 when the bolts are in latching or hold-down position. Portions of the plate are extended upwardly at the opposite ends of the flanges 27 and 28 to constitute upwardly directed guide-tabs which assist in centering the skids relatively to the hold-down plates when the container is lowered onto the transporting vehicle.

When the container is lowered into place on the transporting vehicle, the bolts 20 and 21 either will be removed from the container skids or will be retracted fully so that the center portion 30 of the corresponding hold-down plates 26 can be received in the mid-length openings 16 of the corresponding container skids. After the container has been positioned properly relative to the hold-down plates, the bolts 20 and 21 for each container skid may be inserted through the corresponding openings 14 and then are moved inwardly of the mid-length opening of the corresponding ends of the center portion 30 of the associated hold-down plate 26. The upwardly extending tongues or abutment flanges 22 and 23 on the outer ends of the bolts constitute striking surfaces so that the bolts can be driven into position by hammer blows if necessary. These tongues or abutment flanges also constitute means for driving the bolts backwardly out of latching engagement with the hold-down plate when it is desired to remove the container from the vehicle. As is shown in FIG. 4 when the bolts are in hold-down engagement with the center plate, the ribs 24 and 25 on the bolts are received in the corresponding notches 31 and 32 in the center portion of the hold-down plate to assist in retaining the bolts in proper engagement with the center portion of the hold-down plate. The bolts have a thickness such that they make a reasonably close fit with the under-surface of the center portion 30 of the hold-down plate when they are in latching position, and the container has little or no freedom of movement relative to the supporting vehicle.

Should it be desired to use the vehicle for a purpose other than transporting containers, lag screws securing the hold-down plates 26 to the vehicle may be removed, and the hold-down plates may be removed and retained for re-use on the same or on a different vehicle, so that the plates and bolts may be re-used repeatedly an indefinite number of times, and as the movement of the bolts which latch the container in position does not cause any damage to the hold-down mechanism, nor requires any modification to the structure, the hold-down device may be re-used without repair or modification as many times as may be desired.

In the modified construction shown in FIGS. 5 through 8, inclusive, of the accompanying drawings, the latching bolts are provided in the hold-down element itself, rather than in the skids of the container. In this case, the end walls 17 and 18 of the skid structure at the opposite ends of the mid-length opening 16 of the skid, as well as the supplemental end walls 35 and 36 of the skid construction, are provided with openings which preferably are circular in shape and are centered transversely of the skid.

The hold-down device as shown in FIG. 5 is a double latch structure which is effective to latch the adjacent skids of two containers disposed in side-by-side relationship on the transporting vehicle. It will be understood, however, that the device can be provided in single form, and in fact, the latch constructions at the outer sides of the transporting vehicle will be single form structures. In the construction shown in the drawings, the hold-down device comprises a unitary, flat plate of rectangular shape, having arcuate sleeve means 38 and 39 extending longitudinally thereof, one adjacent to each lateral edge of the plate. The portions of the plate between the arcuate sleeve means 38 and 39, and the adjacent side edges of the plate are provided with apertures, as indicated at 40, through which suitable lag screws or bolts may be inserted to detachably secure the device on the deck or floor of a transporting vehicle.

Figure 7:
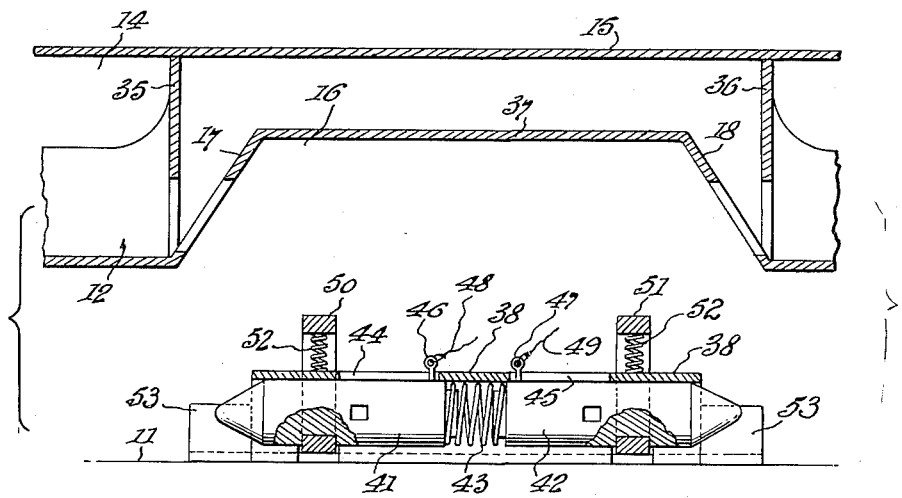
FIG. 7 is a vertical sectional view taken on line 7—7 of FIG. 5, looking in the direction of the arrows, showing a portion of a cargo container in position ready to be latched.
Figure 8:
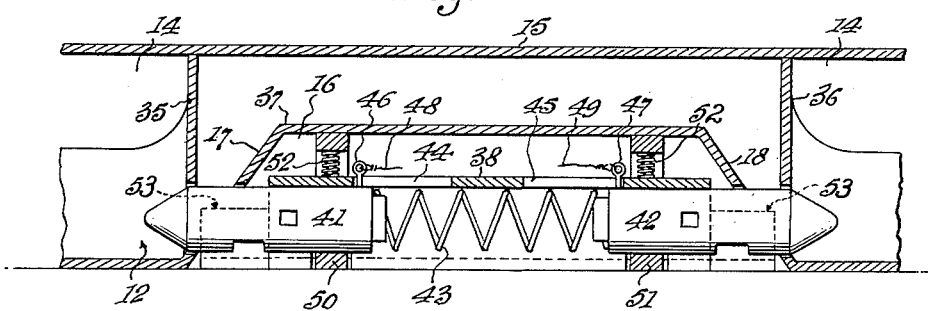
FIG. 8 is a view similar to FIG. 7, but showing the position of the cargo container when latched.

A pair of latching bolts or plungers is disposed in the arcuate sleeve means 38 and 39, the arrangement for the arcuate sleeve means 38 being shown particularly in FIGS. 7 and 8. The two plungers 41 and 42 are disposed in end-to-end relationship in the arcuate sleeve means 38 and are slidable longitudinally therein. The bolt 41 has a pointed end disposed adjacent to one end of the tubular arcuate sleeve means 38, and the bolt 42 has a pointed end disposed adjacent to the opposite end of the arcuate sleeve means 38. The inner ends of the bolts are perpendicular to the longitudinal center lines of the bolts, and a compression spring 43 is disposed between the adjacent ends of the two bolts to urge both of the bolts resiliently outwardly of the tubular arcuate sleeve means 38. The tubular arcuate sleeve means 38 is provided in its top surface with longitudinally extending slots 44 and 45, and eye members 46 and 47, extend from the bolts 41 and 42, respectively, through the slots 44 and 45. Pull cords 48 and 49 extend from the eye members 46 and 47 disposed outwardly of the tubular arcuate sleeve means 38 for retracting the bolts as shown in FIG. 7 against the force of the spring 43.

The bolts 41 and 42 are latched releasably in retracted position by latching members 50 and 51, respectively. Each of the latching members 50 and 51 is of hollow, rectangular shape, as is shown particularly in FIG. 6, and has its bottom side extending through openings in the side walls of the corresponding tubular arcuate sleeve means 38 and under the corresponding plunger 41 or 42. Each of the plungers 41 and 42 is provided with a notch or groove intermediate its length into which the bottom side of the corresponding latch member extends to lock the bolt against longitudinal movement. The latch members are raised to bolt-engaging position by compression springs 52 disposed between the top portion of the arcuate sleeve means 38 and the top sides of the corresponding latching members.

With this arrangement, when the container is lowered into proper position over the latching device, the top wall of the opening 16 in the container skid engages the top surface of the latching members downwardly against the force of the corresponding springs 52, thereby releasing the bolts 41 and 42. The spring 43 then forces the two bolts outwardly of the arcuate sleeve means 38 and into the holes provided in the transverse wall structures 17, 18, 35 and 36 of the associated container skid, so that the bolts firmly latch the container in position on the vehicle. The plate constituting the base of the latch-down structure is provided with upstanding ears or lugs, as are indicated at 53, disposed one pair at each end of each of the arcuate sleeve means 38 and 39. These lugs are spaced symmetrically from the center line of the associated arcuate sleeve means and sufficiently far apart to receive a container skid between the two lugs of each pair to guide the skid accurately into position such that the plungers may project through the appropriate holes in the skid structure as described above. The container thus will be latched into position on the transporting vehicle at the time it is lowered into place on the vehicle.

For releasing the container from the hold-down structure, the pull cords 48 and 49 are pulled in a direction to retract the bolts 41 and 42. While the bolts could be held retracted while the container is being removed by maintaining tension on the pull cords 48 and 49, it has been considered desirable to provide auxiliary latches to hold the bolts retracted while the container still is resting on the latches 50 and 51 and rendering these latches ineffective to hold the bolts in retracted position. Each of such auxiliary latches comprises a small bell-crank lever, as indicated at 55, one such being provided for each of the latching bolts. Lever 55 is mounted rockably at its angle on a fixed pin 56 projecting upwardly from the plate of the hold-down device at the inner side of the corresponding arcuate sleeve means, and has at one end a detent 57 which projects through an opening in the arcuate sleeve means 38 and into a recess in the corresponding bolt to releasably hold the bolt in retracted position. The bell-crank is urged to bolt-latching position by a suitable spring 58, and is moved to release the associated bolt by a pull cord 59, which acts in opposition to the associated spring. The recess engaged by detent 57 of the auxiliary latch preferably is spaced along the bolt from the notch or recess engaged by the latch 50 or 51 so that, after the bolts have been retracted to a position in which they are held by the auxiliary latches and the container has been removed, the auxiliary latches may be released, and the bolts then will be held by the pressure latches 50 and 51 and the auxiliary latches then will not re-engage the bolts.

As is the case of the first-described form of the invention, as has been given above, the modified latch-down construction can be re-used repeatedly on the same vehicle or it can be removed from one vehicle and applied to a different vehicle as may be necessary or desirable and can be re-used without repair or modification.

While the initial cost of the latch-down constructions described herein may be somewhat above the cost of the material used in present methods for securing one container in place on a transporting vehicle, the capabilities of indefinite re-use of the constructions of the present invention render them highly economical over a reasonable period of use. For example, the usual present method of securing the containers in place is to secure them to the vehicle with steel straps which are cut and discarded whenever a container is removed from its transporting vehicle, which procedure becomes highly costly over an extended period of use of the containers.

While the foregoing description is applicable to two preferred illustrative embodiments of the present invention, it will be apparent that the invention is subject to modifications as to structural details as may become evident to one skilled in the art without departing from the scope of this invention; and accordingly, it will be understood that it is intended and desired to embrace within the scope of the invention such modifications and changes as may be necessary or desirable to adapt the invention to varying conditions and uses as defined by the appended claims.

I claim:

1. Apparatus for attaching a cargo container to the deck of a transporter, the said cargo container including parallel skid members having lateral openings and a central bottom opening, comprising:

(a) A hold-down plate having laterally extending attaching flanges adapted to attach the said plate to the transporter deck and a raised sleeve portion intermediate said attaching flanges adapted to be received in the central bottom opening of one of the skid members of the container, the said raised sleeve portion having aligned notches at opposite ends thereof;

(b) A pair of locking bolts each bolt having a substantially flat portion adapted to be partially inserted into one end of the raised sleeve portion of said hold-down plate, and a rib upstanding on said flat portion receivable in one of said notches of the raised sleeve portion, whereby the locking bolts, when in place, securely attach one of said skid members to said hold-down plate; and (c) Locking bolt operating means for selectively advancing and retracting each locking bolt into and out of locking engagement with the skid member and hold-down plate.

2. Apparatus as claimed in claim 1 wherein opposing edges of the attaching flanges of the hold-down plate intermediate the raised sleeve portion of the plate and opposite ends of the flange are bent upwardly defining pairs of guide tabs for guiding said locking bolts into and out of locking position.

3. Apparatus as claimed in claim 1 wherein the said locking bolt operating means comprises an upwardly extending tongue on the outer end of each bolt, the said tongue constituting a striking surface whereby the bolt may be driven into and out of locking position.

References Cited in the file of this patent

UNITED STATES PATENTS

| | | |
|---|---|---|
| 1,095,636 | Hummer | May 5, 1914 |
| 1,408,413 | Smith | Feb. 28, 1922 |
| 1,666,148 | Rick | Apr. 17, 1928 |
| 2,166,948 | Fitch | July 25, 1939 |
| 2,902,247 | Loomis | Sept. 1, 1959 |

OTHER REFERENCES

"Lock Fast" Instant Furniture Fastener, copyright 1953, pub. 1954.